United States Patent [19]
Berrocal et al.

[11] Patent Number: 6,033,700
[45] Date of Patent: *Mar. 7, 2000

[54] DEMINERALIZATION OF MILK AND MILK-DERIVED PRODUCTS BY ELECTRODEIONIZATION

[75] Inventors: Rafael Berrocal, St-Legier; Michel Chaveron, La Tour-de-Peilz, both of Switzerland

[73] Assignee: Nestec S.A., Vevey, Switzerland

[ * ] Notice: This patent is subject to a terminal disclaimer.

[21] Appl. No.: 08/946,848

[22] Filed: Oct. 8, 1997

[30] Foreign Application Priority Data

Oct. 9, 1996 [EP] European Pat. Off. ............. 96202809

[51] Int. Cl.[7] ............................. A21D 6/00; A23C 21/00; B01D 49/00
[52] U.S. Cl. ......................... 426/239; 426/583; 426/491; 426/495; 210/677; 210/663; 210/669; 210/681
[58] Field of Search ..................................... 426/239, 491, 426/583, 801, 495; 210/677, 663, 669, 681; 204/182.5, 182.4, 301, 252–257, 263

[56] References Cited

U.S. PATENT DOCUMENTS

| | | | |
|---|---|---|---|
| 3,645,884 | 2/1972 | Gilliland | 204/632 |
| 4,138,501 | 2/1979 | Chaveron et al. | 426/239 |
| 4,497,836 | 2/1985 | Marquadt et al. | 426/239 |
| 4,632,745 | 12/1986 | Giuffrida et al. | 204/632 |
| 4,803,089 | 2/1989 | Chaveron et al. | 426/239 |
| 5,084,285 | 1/1992 | Shimatani et al. | 426/271 |
| 5,116,509 | 5/1992 | White | 210/644 |
| 5,120,416 | 6/1992 | Parsi et al. | 204/536 |
| 5,154,809 | 10/1992 | Oren et al. | 204/524 |
| 5,503,729 | 4/1996 | Batchelder et al. | 204/630 |

FOREIGN PATENT DOCUMENTS 1193630  11/1959  France .

OTHER PUBLICATIONS

Delaney, "Demineralization of Whey", The Australian Journal of Dairy Technology–Mar. 1976, pp. 12–17.

*Primary Examiner*—Mary E. Mosher
*Assistant Examiner*—Ali R. Salimi
*Attorney, Agent, or Firm*—Vogt & O'Donnell, LLP

[57] ABSTRACT

A liquid milk product, including a milk and a whey, but other than sweet whey, is demineralized by an electrodeionization process by passing the product to be demineralized through a resin bed of strong cationic exchange resin contained in an electrodeionization dilution compartment or through a resin bed of weak anionic and of cationic, particularly strong cationic, exchange resins in the compartment, and in the process, the pH of the wash solution present in the electrodionization cation and anion concentration compartments is maintained so that the solution present in each concentration compartment has a pH value less than 5.

19 Claims, 1 Drawing Sheet

DEMINERALIZATION OF MILK AND MILK-DERIVED PRODUCTS BY ELECTRODEIONIZATION

BACKGROUND OF THE INVENTION

The invention concerns the field of the demineralization of milk products and derivatives with an electrodeionization process.

Milk products and derivatives, either liquids or powders, may be used as components of products for infants and dietetic products, in particular milks adapted to mother's milk. Demineralized milks and derivatives have also other applications, for example as ingredients for the replacement of skimmed milk in confectionery-chocolate manufacture or in the manufacture of reconstituted milks.

The most effective known processes for demineralizing milk products and derivatives are electrodialysis and ion exchange, which are applied separately or in combination. In electrodialysis, ionized salts in solution in the whey migrate under the effect of an electric field through membranes which are selectively permeable to cations and anions and are eliminated in the form of brine. In ion exchange, the ionic equilibrium is used between a resin as the solid phase and the whey to be demineralized as the liquid phase, the ions being adsorbed on the resin of the same nature during the saturation phase, and the resins are then regenerated.

For reasons of productivity, these two techniques are advantageously combined in a two-step process applied to the demineralization of whey, electrodialysis ensuring an initial demineralization to approximately 50–60% and ion exchange, preferably multi-stage with successive weakly cationic and strongly cationic resins, achieving final demineralization to approximately 90–95%, as is described for example in U.S. Pat. No. 4,803,089.

These processes have the disadvantages that the ionic exchange stage requires large quantities of regenerating chemicals and consumes a large amount of water and that electrodialysis cannot be used beyond a degree of demineralization >60% due to its large electrical energy demand.

Electrodeionization, which is for example the subject of U.S. Pat. No. 4,632,745 or U.S. Pat. No. 5,120,416, carries out deionization continuously in the treatment of water by combining electro-dialysis and ion exchange in a single module, which has the advantage of low consumption of water and energy and eliminates the necessity of chemically regenerating the resins.

The electrodeionization technique consists of circulating the water to be demineralized through an assembly of cells in parallel delimited by cationic and anionic semi-permeable membranes and containing a mixture of resin beads, referred to as dilution compartments, these dilution compartments being separated from each other and their assembly being separated from the outside by spacers, forming compartments referred to as concentration compartments, delimited by anionic and cationic semi-permeable membranes, the complete assembly being placed between a cathodic compartment and an anodic compartment connected to an electrical supply. Wash water is circulated through the concentration spaces, which enables the ions which concentrate there, on account of their polarity, to be eliminated in the form of effluent, by migrating through the membranes under the effect of the electric field from the dilution compartments to the concentration compartments.

Unlike the case of electrodialysis, resin beads loaded with adsorbed ions serve to maintain a sufficient electrical conductivity in the dilution compartments throughout the demineralization process. Moreover, it is not necessary to regenerate the resin beads, since the sites saturated with cations and anions are exchanged progressively with $H^+$ and $OH^-$ under the effect of the electric field.

In the process according to U.S. Pat. No. 4,632,745, resin beads are incorporated in a fixed manner in the dilution compartments whereas in the process according to U.S. Pat. No. 5,120,416, the beads are movable and it is possible to introduce them into the dilution compartments and to extract them from the compartments by circulation in the form of a suspension. In these known processes applied to water, the resins are present in a mixed bed of beads of a strongly cationic and strongly anionic type.

SUMMARY OF THE INVENTION

The present invention provides a process for the demineralization of milk products and derivatives, to the exclusion of sweet whey from cheese manufacture, characterized in that a liquid raw material of milk origin is electrodeionized in an apparatus comprising dilution compartments and concentration compartments, that in the case of a raw material other than a milk, the dilution compartments contain a bed of resin beads consisting of a strongly cationic resin alone or a bed of a mixture of a cationic resin and a weakly anionic resin and the concentration compartments either:

i) do not contain any resin, ii) contain a bed of resins beads consisting of a mixture of a cationic resin and a weakly anionic resin, or iii) contain a bed of strongly cationic resin beads, that in the case of a raw material consisting of milk, the dilution compartments contain resin beads consisting of a mixture of a cationic resin and a weakly anionic resin and the concentration compartments are as indicated previously under i), ii) or iii) and in that the pH of the concentration compartments is adjusted to a value of less than 5.

DETAILED DESCRIPTION OF THE INVENTION

Figure 1:
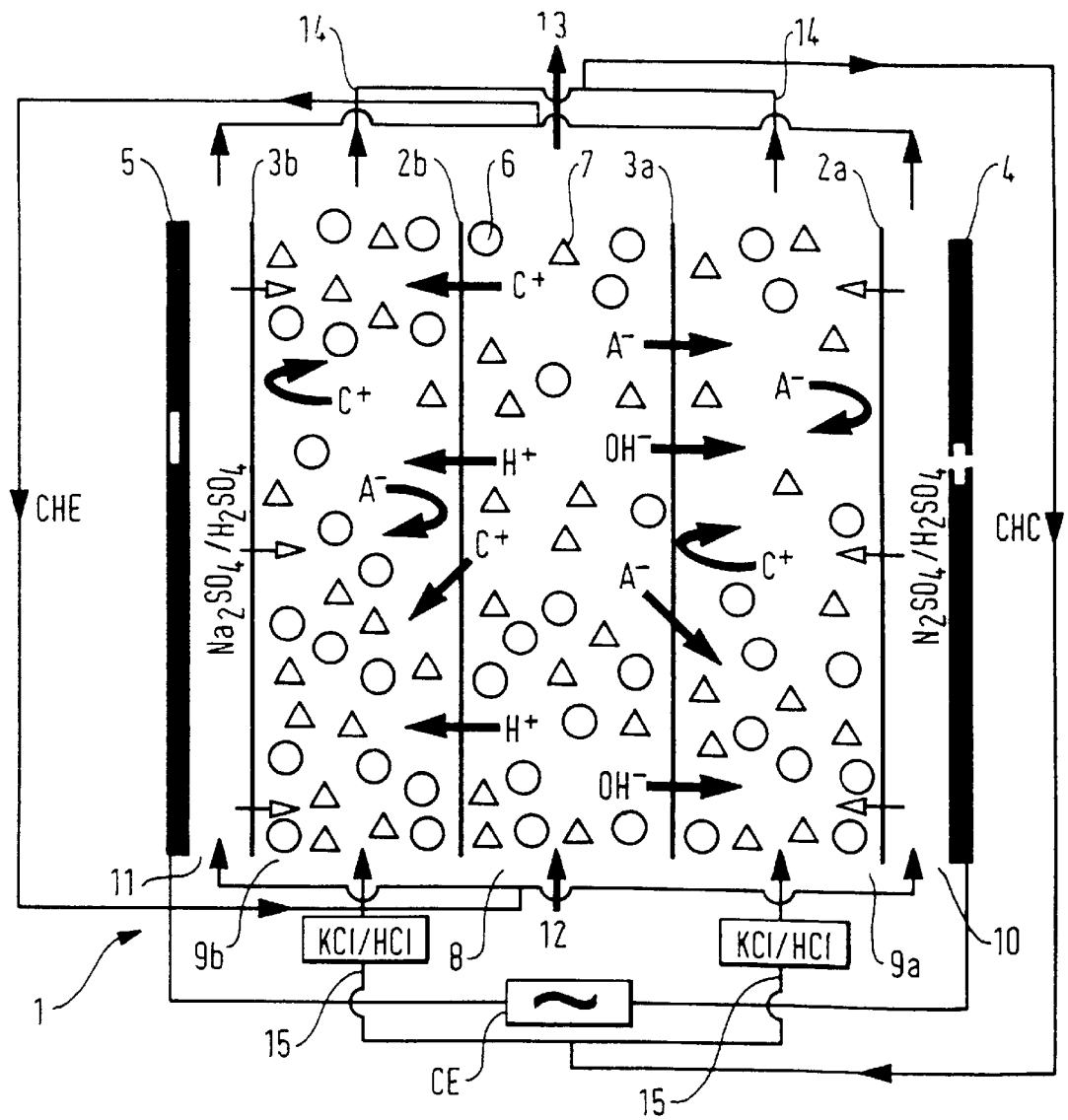

Within the context of the invention, a liquid raw material of milk origin is designated as a permeate from the microfiltration or ultrafiltration of skimmed milk, an acid whey from casein manufacture or cheese manufacture, namely a liquid obtained after coagulation of casein by acidification, a permeate from the ultrafiltration of such a whey, a permeate from the microfiltration of sweet whey from cheese manufacture, their equivalents and their mixtures, it being possible for these raw materials to be raw, more or less concentrated or reconstituted in an aqueous medium from powders by recombination. A raw material of milk origin which can be used in the process of the invention excludes a sweet whey from cheese manufacture, i.e. obtained from coagulation of casein by rennet, such a product which is concentrated for example by evaporation or nanofiltration, and also such products reconstituted from powders.

In the case where the raw material is a milk, a strongly cationic resin is not used alone in the dilution compartments so as to prevent casein precipitating under the effect of the acid pH. On the other hand, a strongly cationic resin can be used alone perfectly well in these compartments when the raw material is other than milk, since there is then no risk of precipitation of the casein.

Any material normally used in ion exchange may be used as the resin, for example macro-reticulated, in the form of a gel or in a macroporous form, as long as this material has the rigidity compatible with its confinement in cells and does not fix proteins by absorption or adsorption.

According to a preferred embodiment of the process, electrodeionization is carried out with a bed mixture of strongly cationic and weakly anionic resin beads in concentration and dilution compartments. With this embodiment, we have found that demineralization from the anions which it is desired to eliminate, essentially $Cl^-$ and citrates, as well as demineralization from cations, essentially $K^+$, $Na^+$, $Ca^{++}$ and $Mg^{++}$, is carried out in a satisfactory manner without the well known losses of proteins. The strongly cationic and weakly anionic resin beads are in a mixed or layered bed in the compartments, preferably in weight proportions of strongly cationic resin/weakly anionic resin of 30–40%/70–60%. The strongly cationic resin is in particular in the $H^+$ form and the weakly anionic resin is in the $OH^-$ form.

We found that, when the concentration compartments were filled with a mixed bed or when these compartments were empty, the pH increased during demineralization. This fact, combined with the increase in the concentration of calcium and phosphorus coming from the dilution compartments, brought about a regular fall with time in the flow and an increase in pressure in these compartments, probably due to precipitation of calcium phosphates. It is essential that this phenomenon is overcome by preventing the pH exceeding 5 in these compartments. To this end, an acid aqueous solution is added, for example HCl, preferably by means of a pH-stat.

This measure is not necessary when the concentration compartments are filled with the cationic resin alone, which then has the function of reducing the pH by continually liberating H+ ions.

In carrying out the process of the present invention, it was also observed that the conductivity fell in the electrode compartments during demineralization. When the conductivity became too low in these compartments, demineralization slowed down or even stopped. To prevent this, acid was continually added, for example an aqueous sulphuric acid solution, so as to maintain the conductivity at a value compatible with efficient demineralization, a value which is at least 5 mS and for example at a value >5–20 mS.

When intensive de-anionization is required, in the case where raw materials other than milk are treated, in particular acid whey, it is preferable to increase the pH of the substrate to a value of approximately 7.5–8, either at the start of the demineralization process, or when the degree of demineralization has reached approximately 70%, by making the substrate alkaline, for example by means of a strong base such as KOH. As an alternative, Ca hydroxide may be added and optionally, heating is carried out, for example at approximately 45° C./20 min., and the precipitate formed is then removed. Another alternative of this de-anionization consists of passing the substrate, for example demineralized to approximately 80%, through a column of weakly anionic resin.

The process according to the invention may be carried out continuously, in which case the substrate may on the one hand be directed to the dilution compartment of the module and then discharged from this compartment progressively in the form of the demineralized product, and on the other hand the washing flow may be directed towards the concentration compartment and the brine discharged from it progressively.

In an alternative embodiment, in a discontinuous manner or in batches, the substrate may be recirculated in a loop through the dilution compartment and the brine may be recirculated in a loop through the concentration compartment, until the desired degree of demineralization is attained.

After demineralization, the reactant obtained may be possibly neutralized by the addition of an alkali, preferably of food quality, and then dried, for example by spraying in a drying tower.

The product obtained by putting the process according to the invention into practice, whether it be a liquid or a powder, may serve as an ingredient in the manufacture of a foodstuff intended for human or animal consumption.

The product may be used as a replacement for milk or whey as an ingredient in the manufacture of confectionery/chocolate products, or may be used in particular as a replacement for whey in the manufacture of products for infants, in particular milks adapted to mother's milk.

The process according to the invention is described in greater detail with reference to the accompanying drawing.

BRIEF DESCRIPTION OF THE DRAWING FIGURE

The sole accompanying drawing FIGURE diagrammatically illustrates apparatus for practice of the electrodeionization process of the present invention.

DETAILED DESCRIPTION OF THE DRAWING FIGURE

The accompanying drawing FIGURE presents a simplified description of apparatus for carrying out the electrodeionization process of the invention in that it illustrates only a single sequence of alternate cells rather than a module which comprises several sequences of alternate cells arranged in parallel.

In the drawing FIGURE, module 1 comprises alternating semi-permeable polymeric membranes between the electrodes, an anode 4 and a cathode 5. Membranes 2a and 2b are permeable to cations and impermeable to anions, which are negatively charged, for example by sulphonic groups; and membranes 3a and 3b are permeable to anions and impermeable to cations, which are positively charged, for example by bearing quaternary ammonium groups.

The membranes 2b and 3a delimit a cell filled with a bed of resin beads, for example strongly cationic beads 6 and weakly anionic resin beads 7, in mixed beds, constituting a dilution compartment 8 surrounded by two spacers delimited respectively by the membranes 2a, 3a and 2b, 3b, the space being filled with a bed of resin beads and forming the concentration compartments 9a, 9b. The anodic 10 and cathodic 11 compartments surround the concentration compartments 9a, 9b situated at the ends of the module.

In operation, the flow of substrate 12 to be demineralized passes through the dilution compartment 8 in which its cations such as $C^+$ are removed, adsorbed by the strongly cationic resin, and in which its anions such as $A^-$ are removed, adsorbed by the weakly anionic resin.

Under the effect of the electric field CE created between the electrodes, the anions are directed towards the anode 4, passing through the membrane 3a and are repelled by the membrane 2a. At the same time, the cations are directed towards the cathode 5, passing through the membrane 2b and are returned by the membrane 3b. The result is an impoverishment of the substrate 12 in ions, which is discharged in the form of a flow of demineralized reactant 13, and in an enrichment in ions of the flow of wash solution 15 which enters the concentrations compartments 9a, 9b and which is discharged from these in the form of a flow of brine 14. These flows constitute the hydraulic circuit of the concentration compartments, CHC.

In a concomitant manner, cations pass from the anodic compartment 10 to the concentration compartment 9a through the membrane 2a and are repelled at the membrane 3a, whereas the H$^+$ ions migrate through all the module and regenerate the strongly cationic resin beads. At the same time, anions pass from the cathodic compartment 11 to the concentration compartment 9b through the membrane 3b and are repelled at the membrane 2b, whereas the OH$^-$ ions migrate throughout the module and regenerate the weakly anionic resin beads. In all, electrolysis of the water is produced providing regenerating ions. The flows circulating in the anodic and cathodic compartments and from one to the other constitute the hydraulic circuit of the electrode compartments CHE.

The following Examples illustrate the invention.

EXAMPLES

In the Examples, percentages and parts are by weight, unless indicated to the contrary, prior to their treatment, the raw materials were centrifuged at 2000 g or filtered so as to remove solid particles likely to block the module, and the analytical values were obtained by the following methods raw protein content: calculated from measurements by the Kjeldhal method of total nitrogen (TN)×6.38, true protein content: calculated from measurements by the Kjeldhal method of total nitrogen (TN) and non-protein nitrogen (NPN), i.e. as (TN−NPN)×6.38, ash: determined by calcination at 550° C., cation contents (Ca$^{++}$, Mg$^{++}$, Na$^+$, K$^+$) and phosphorus content: measured by atomic absorption spectroscopy (AAS), citrate and lactate contents: determined by enzyme methods (Boehringer Mannheim, 1984), and Cl$^-$ contents: measured by potentiometric titration with AgNO$_3$ using a silver electrode.

Example 1

The modules were rinsed thoroughly, the dilution and concentration compartments of which containing beads in mixed beds of a strongly cationic resin HP111 (H$^+$ form)/weakly anionic resin HP661 (OH$^-$ form), Rohm and Haas, in the proportion 40/60, were filled with distilled water and the various compartments were filled in the following manner:

the electrode compartments with 4 l of an aqueous solution containing 7 g/l Na$_2$SO$_4$, the pH of which was adjusted to 2 with H$_2$SO$_4$, the concentration compartments with 4 l of an aqueous solution containing 2.5 g/l of NaCl, and the dilution compartments with 2.5 kg of the substrate to be demineralized, namely a skimmed milk concentrated by evaporation to 23.2% dry matter.

After 10 min of recirculation to stabilize the pressure in the various compartments, 400 ml of the substrate were taken from the dilution compartment, weighed and retained for analysis. The voltage was set at the maximum value of 28 V, the electric current started to flow between the electrodes and demineralization commenced. The conductivity, temperature and pH in the various compartments were checked continuously and the desired partial demineralization was achieved, i.e. a reduction in the saline elements Na$^+$, K$^+$, Cl$^-$, without reducing calcium too much. Demineralization was stopped when the ash content was reduced by 30% compared with the starting product. Demineralization occurred discontinuously, in batches, i.e. by circulating the substrate through the module until all the volume of the charge had reached the conductivity set as an objective.

At the end of the demineralization process, the current was switched off, the total volume of the demineralized reactant was collected, i.e. the permeate, and it was weighed and dried by freeze-drying. The procedure was the same with the brine from the concentration compartment or the residue and with the solutions from the electrode compartments.

Finally, the module was rinsed several times with distilled water or, if necessary, it was washed with a solution containing 2.5% NaCl/1% NaOH or with a solution of 5% NaCl/1% Na percarbonate, and it was rinsed with distilled water and was kept full of water between charges.

The results obtained are shown in Table 1.

TABLE 1

| Product | Raw proteins TN × 6.38 | Ash (%) | Na (%) | K (%) | Ca (%) | Mg (%) | Lactose (%) |
|---|---|---|---|---|---|---|---|
| Evaporated milk | 37.11 | 8.32 | 0.55 | 1.58 | 1.3 | 0.113 | 49.46 |
| Electro-deionized evaporated milk | 37.89 | 5.83 | 0.48 | 0.67 | 1.14 | 0.082 | 50.11 |

No loss of proteins was noted. The product obtained after treatment had special gustative properties. It was in particular less salty and sweeter than standard evaporated milk when it was compared with the latter having the same fat content. It was also more heat stable.

Example 2

As in Example 1, a permeate from the microfiltration of skimmed milk was demineralized by passing the skimmed milk through a module provided with a 0.14 micron TEC-SEP inorganic membrane, to give a volume concentration factor of 6×.

The selected degree of demineralization was 95%. The results obtained are shown in Table 2.

TABLE 2

| Product | Raw proteins TN × 9.06 | Ash (%) | Lactose (%) | Na (%) | K (%) | Ca (%) | Mg (%) | P (%) | Citrate (%) |
|---|---|---|---|---|---|---|---|---|---|
| Permeate from microfiltration of skimmed milk | 9.06 | 7.32 | — | 0.595 | 2.45 | 0.46 | 0.109 | 0.627 | 2.59 |

TABLE 2-continued

| Product | Raw proteins TN × 9.06 | Ash (%) | Lactose (%) | Na (%) | K (%) | Ca (%) | Mg (%) | P (%) | Citrate (%) |
|---|---|---|---|---|---|---|---|---|---|
| Permeate from microfiltration of electrodeionized skimmed milk | 9.8 | 0.39 | 85.01 | 0.054 | 0.04 | 0.031 | 0.016 | 0.13 | 0.46 |

—: not measured

The loss of true proteins was approximately 5%.

Example 3

As in Example 2, demineralization was carried out on a permeate from the microfiltration of sweet whey from cheese manufacture, reconstituted from powder, which had been previously microfiltered as in example 2. The selected degree of demineralization was 97%. The results obtained are shown in Table 3.

TABLE 3

| Product | Raw proteins TN × 6.38 | True proteins (TN-NPN) × 6.38 | Ash (%) | Na (%) | K (%) | Ca (%) | Mg (%) |
|---|---|---|---|---|---|---|---|
| Permeate from microfiltration of sweet whey | 10.65 | 8.22 | 7.51 | 1.75 | 1.13 | 0.29 | 0.63 |
| Permeate from microfiltration of electrodeionized sweet whey | 9.63 | 8.18 | 0.24 | 0.04 | 0.019 | 0.016 | 0.002 |

There was practically no loss of true proteins.

Example 4

As in Example 2, demineralization was carried out on a preconcentrated acid whey from casein-making, but with the dilution compartment filled with a 40/60% mixture of a strongly cationic resin HP 111 (H+ form)/weakly anionic resin HP661 (OH– form), from Rohm & Haas, and with the concentration compartment left empty.

At the end of approximately 30–40 min., the pH in the concentration compartment had increased to a value approaching 5, and a regular reduction in the flow rate was noted together with an increase in pressure in this compartment. The pH was then maintained below 5 with automatic compensation by adding a 30% aqueous solution of HCl, for example by means of a pH-stat.

A reduction in the conductivity was also noted in the electrode compartments, which was maintained at 5–20 mS by continually adding an aqueous solution of sulphuric acid.

Example 5

As in Example 2, demineralization was carried out on a preconcentrated acid whey from casein-making, but with the dilution compartment filled with a 40/60% mixture of a strongly cationic resin HP 111 (H+ form)/weakly anionic resin HP661 (OH– form), from Rohm & Haas, and with the concentration compartment filled with the strongly cationic resin HP111 (H+ form). Under these conditions, it was the strong resin which maintained the pH in the acid region.

In addition, the conductivity in the electrode compartments was maintained at 5–20 mS by continually adding an aqueous solution of sulphuric acid.

Example 6

The procedure was as in Example 4, apart from the fact that once a demineralization level of 75% was reached, the pH of the substrate entering the apparatus was adjusted to 7.5–8 by the addition of an aqueous solution of KOH and the pH was maintained at this value until a demineralization level of 90% was reached. A substantial reduction was thus obtained in the quantity of anions present in the final liquid whey, compared with that obtained without prior adjustment of the pH.

We claim:

1. In an electrodeionization process for demineralizing a substrate wherein a substrate comprising cations and anions is passed through an ion exchange resin bed contained in a dilution compartment between a cation-permeable membrane and an anion-permeable membrane, wherein an electric conductivity field produced from electrodes contained in electrode compartments directs cations from the dilution compartment via the cation-permeable membrane to a cation concentration compartment and directs anions from the dilution compartment via the anion-permeable membrane to an anion concentration compartment, wherein a wash solution is passed into and through the cation and anion concentration compartments for removing cations and anions from the concentration compartments and wherein a product from which cations and anions have been removed is collected from the dilution compartment, the improvements comprising:

passing a liquid material of milk origin through a dilution compartment resin bed which comprises strong cationic exchange resin beads and maintaining a pH of the wash solution so that the solution present in the cation and anion concentration compartments has a pH value of less than 5 and wherein the liquid material is not sweet whey and is selected from the group consisting of an acid whey and of a permeate selected from the group consisting of a permeate from microfiltration or ultrafiltration of skimmed milk, from ultrafiltration of acid whey and from microfiltration of sweet whey.

2. A process according to claim 1 wherein the resin bed consists essentially of the strong cationic exchange resin.

3. In a electrodeionization process for demineralizing a substrate wherein a substrate comprising cations and anions is passed through an ion exchange resin bed contained in a dilution compartment between a cation-permeable membrane and an anion-permeable membrane, wherein an electric field produced from electrodes contained in electrode compartments directs cations from the dilution compartment via the cation-permeable membrane to a cation concentration compartment and directs anions from the dilution compartment via the anion-permeable membrane to an anion concentration compartment, wherein a wash solution is passed into and through the cation and anion concentration compartments for removing cations and anions from the concentration compartments and wherein a product from which cations and anions have been removed is collected from the dilution compartment, the improvements comprising:

passing a liquid material selected from the group consisting of a milk and of a material of milk origin through a dilution compartment resin bed which comprises cationic exchange resin beads and weak anionic exchange resin beads and maintaining a pH of the wash solution so that the solution present in the cation and anion concentration compartments has a pH value of less than 5 and wherein the liquid material of milk origin is not sweet whey and is selected from the group consisting of an acid whey and of a permeate selected from the group consisting of a permeate from microfiltration or ultrafiltration of skimmed milk, from ultrafiltration of acid whey and from microfiltration of sweet whey.

4. A process according to claim 3 wherein the cationic exchange resin beads are strong cationic exchange resin beads.

5. A process according to claim 1 or 3 wherein the wash solution is passed through concentration compartments which do not contain an ion exchange resin.

6. A process according to claim 1 or 3 further comprising passing the wash solution through a resin bed which is present in each concentration compartment and which comprises cationic and weak anionic exchange resin beads.

7. A process according to claim 6 wherein the cationic resin beads are strong cationic resin beads.

8. A process according to claim 1 or 3 further comprising passing the wash solution through a resin bed which is present in each concentration compartment and which comprises a strong cationic exchange resin to maintain the pH of the solution present in each compartment so that the solution present has a pH value less than 5.

9. A process according to claim 1 or 3 wherein the wash solution is acidic to maintain the pH value.

10. A process according to claim 9 wherein the wash solution comprises hydrochloric acid.

11. A process according to claim 3 wherein the resin beds are arranged in an arrangement selected from the group consisting of a mixed bed and a layered bed.

12. A process according to claim 6 wherein the resin beds are arranged in an arrangement selected from the group consisting of a mixed bed and a layered bed.

13. A process according to claim 4 wherein, by weight proportion of strong cationic exchange resin beads to weak anionic exchange resin beads, the resin beads are in amounts of from 30%–40% cationic resin to 70%–60% anionic resin.

14. A process according to claim 6 wherein, by weight proportion of strong cationic exchange resin beads to weak anionic exchange resin beads, the resin beads are in amounts of from 30%–40% cationic resin to 70%–60% anionic resin.

15. A process according to claim 4 wherein the strong cationic exchange resin beads are in an $H^+$ form and the weak anionic exchange resin beads are in an $OH^-$ form.

16. A process according to claim 6 wherein the strong cationic exchange resin beads are in an $H^+$ form and the weak anionic exchange resin beads are in an $OH^-$ form.

17. A process according to claim 1 or 3 wherein the electrical conductivity is maintained at at least 5 mS.

18. A process according to claim 1 or 3 further comprising treating the sweet whey passed to the resin bed so that the sweet whey passed to the resin bed has a pH of from 7.5 to 8.

19. A process according to claim 3 wherein the liquid material is a milk and the milk is a concentrated skimmed milk.

* * * * *